United States Patent
Stone et al.

(10) Patent No.: US 9,081,465 B1
(45) Date of Patent: Jul. 14, 2015

(54) SYSTEM AND METHOD FOR ENABLING A USER TO ADD AND VIEW RESOURCE CONTENT WITHIN A CALENDAR

(75) Inventors: Kevin M. Stone, Portland, OR (US); Jonathan Baciu, San Francisco, CA (US)

(73) Assignee: Performio Solutions, Inc., Portland, OR (US)

( * ) Notice: Subject to any disclaimer, the term of this patent is extended or adjusted under 35 U.S.C. 154(b) by 465 days.

(21) Appl. No.: 13/303,139

(22) Filed: Nov. 22, 2011

(51) Int. Cl.
*G06F 3/048* (2013.01)

(52) U.S. Cl.
CPC ...................................... *G06F 3/048* (2013.01)

(58) Field of Classification Search
CPC ..... G06F 3/0486; G06F 9/4443; G06F 3/048; G06F 3/04883
USPC .......................................................... 715/769
See application file for complete search history.

(56) References Cited

U.S. PATENT DOCUMENTS

| | | | | |
|---|---|---|---|---|
| 6,073,110 | A * | 6/2000 | Rhodes et al. | 705/7.12 |
| 2006/0035206 | A1* | 2/2006 | Clark et al. | 434/350 |
| 2009/0158173 | A1* | 6/2009 | Palahnuk et al. | 715/753 |
| 2009/0204921 | A1* | 8/2009 | Vestyck | 715/769 |

* cited by examiner

*Primary Examiner* — William Bashore
*Assistant Examiner* — Jeanette J Parker
(74) *Attorney, Agent, or Firm* — Lessani Law Group, PC

(57) ABSTRACT

A system and method is provided for enabling a user to add and view resource content within a calendar. The method includes displaying in a user interface both a calendar view and a resources view. A user is able to drag a representation of a resource from the resources view to the calendar view. In response to the user dragging the representation of a resource to the calendar view, a link to the resource is added to a calendar event in the calendar view. The user is then able to open the resource from the calendar event.

32 Claims, 6 Drawing Sheets

5th | NS1.1 | Estimate, round, and manipulate very large (e.g., millions) and very small...
Created by Kevin Stone, last updated 03:51 PM
Dates 10/17/2011 to 10/17/2011

Lesson Notes | ⊚ Standards | 🖧 Resources

Guide         CA | 5th - Math
Objective number   NS1.1
Priority      1
Strand        Number Sense
Standard Estimate, round, and manipulate very large (e.g., millions) and very small (e.g., thousandths) numbers.
Standard rewritten I can estimate, round, add, subtract, multiply and divide very large (e.g., millions) and very small (e.g., thousandths) numbers.
Sample question What is 6050.287 rounded to the nearest ten?

A 6050
B 6100
C 6050.29
D 6050.3

Answer: A

5th | NS1.1 | Estimate, round, and manipulate very large (e.g., millions) and very small...  — 510
500

Created by Kevin Stone, last updated 03:51 PM
Dates [10/17/2011] to [10/17/2011] — 520

Lesson Notes  ◎ Standards   ♧ Resources — 550
       530        540

♧ Resources (3)
♧ Rounding to Estimate Differences by Yoni Baciu at 10/17/2011 11:42 AM X  ⎫
♧ Rounding to Estimate Sums by Yoni Baciu at 10/17/2011 11:43 AM X         ⎬ 560
♧ Rounding Whole Numbers 1 by Yoni Baciu at 10/17/2011 11:48 AM X          ⎭
Add

[Update] [Update & Close] [Delete]

SYSTEM AND METHOD FOR ENABLING A USER TO ADD AND VIEW RESOURCE CONTENT WITHIN A CALENDAR

BACKGROUND OF THE INVENTION

1. Field of the Invention

This invention relates generally to a system having calendaring functionality and, more particularly, to enabling a user to add and view resource content within a calendar.

2. Description of the Background Art

In many fields of endeavor, a person needs a project management or planning system that efficiently combines their necessary tools or resources. In the field of education, in particular, teachers prepare course plans (or pacing guides) for a class. Typically, their course plan would be prepared and stored in a calendar, while all of the other related resources, such as the daily lesson plans, worksheets, assessments (e.g., tests and quizzes), and teaching videos would be stored separately. Thus, the typical system for handling the course plan is inefficient and cumbersome. In addition, teachers must make sure that their course plan and all the related resources align to the state or district's educational standards. This requires comparing the education standard to each resource associated with the particular lesson plan. This too adds to the inefficiency. Therefore, there is the need for a system and method for combining the resource content associated with the applicable education standards within an easy to use calendar interface. For other management/planning systems that provided calendaring functionality, there also is a need to enable users to easily add resources to the calendar and view the resources from within the calendar.

SUMMARY OF THE INVENTION

The present invention is directed to a system and method for enabling a user to add and view resource content within a calendar.

A calendar view and a resources view are displayed in a user interface. A user is then able to drag a representation of a resource from the resources view to the calendar view. In response to the user dragging a representation of a resource to the calendar view, a link to the resource is added to a calendar event in the calendar view. A user is then able to open the resource from the calendar event. The resource may be in the form of a file, a video, a form, a report, a person, a link to a website, or many others.

In certain embodiments, the resources that are displayed in the resources view are the result of a search for resources based on search terms entered and/or filters selected by the user in the user interface. In other embodiments, the resources displayed in the resources view are in a tree view of the resources in the user interface.

In one embodiment, a resource may be dragged to an existing calendar event. In another embodiment, a resource may be dragged to a blank day in the calendar view where a new calendar event is created and a link to the resource is added to the new calendar event.

In certain embodiments, when a user drags a representation of a resource to the calendar view, links to multiple resources associated with the dragged representation of the resource are added to a calendar event in the calendar view. In certain embodiments, when a user drags a representation of a collection resource to the calendar view, links to multiple resources associated with the dragged representation of the collection resource are added to one or more calendar events in the calendar view. The collection resources may be scheduled relative to one another.

In certain embodiments, when a user drags a representation of a resource to the calendar view, the user is provided with an option of selecting one or more of the available calendars, adding a link to the resource to a calendar event in each of the selected calendar views, and enabling the user to open the resource from the calendar event. In some embodiments, a predetermined set of rules may be established by which certain resources may not be added to certain calendars.

In certain embodiments, dragging a representation of a resource from the resources view to the calendar view triggers an automatic action, which may take place immediately or at a future time. For example, the automatic action may include automatically charging the user for the resource. In other embodiments, dragging a representation of a resource from the resources view to the calendar view prompts the user for an action, such as for example, adding another event to the calendar.

In certain embodiments, the system enables teachers to create a course plan for a class where the calendar event is a teaching event. Types of teaching events may include lessons and assessments (e.g., tests and quizzes) and one type of a resource may be a lesson plan. Each teaching event and each resource may be associated with an education standard. In certain embodiments, when a user drags a resource to a blank day in the calendar view, a new teaching event is created that corresponds to the standard associated with the dragged resource and a link to the dragged resource is added to the new teaching event. As a result, each teaching event may set forth the applicable education standard, one or more links to lesson plan resources associated with the education standard, and one or more links to video resources associated with the education standard.

BRIEF DESCRIPTION OF THE DRAWINGS

FIG. 4 is an illustration of a calendar event with the education standard tab selected as an exemplary user interface of the present system.

FIG. 5 is an illustration of a calendar event with the resources tab selected as an exemplary user interface of the present system.

DETAILED DESCRIPTION OF THE PREFERRED EMBODIMENTS

The present invention provides a user interface via which a user can search for and view resources, easily add the resources to a calendar view, and access the resources from the calendar. In a preferred method, shown in FIG. 1, a user interface is provided, which simultaneously displays both a calendar view and a resources view (step 110). The resource view displays one or more different types of resources. For example, the resources may be files stored in a local or remote database or file system (e.g., Microsoft Word documents, Adobe Acrobat files, Excel spreadsheets, PowerPoint presentations, or Google Docs), multimedia files (e.g., video or audio files), forms or templates, reports, websites, people, or many others. Resources may be downloaded or accessible through a link. In a preferred embodiment, the resource view includes search tools (e.g., a search box, or a filter tool) via which a user can search for resources. Resources satisfying the search criteria are then displayed in the resources view. In certain embodiments, the resources are displayed in a tree view of resources in the user interface.

A user of the interface is able to drag a representation of a resource from the resources view to the calendar view (step 120). Once the user drags the resource to the calendar view, a link to the resource is added to a calendar event in the calendar view (step 130). If the user desires to add the resource to an already existing calendar event, the user simply drags the representation of the resource to the calendar event and a link to the resource is added to the calendar event. If, however, a calendar event does not yet exist, by dragging the representation to a blank day in the calendar, a calendar event will be created and a link to the resource added to the new calendar event. The user is then able to select the calendar event and open the resource from the calendar event (step 140). In the preferred embodiment, each resource is associated with a task in the system and the new calendar event corresponds to the task associated with the dragged resource.

Figure 1:
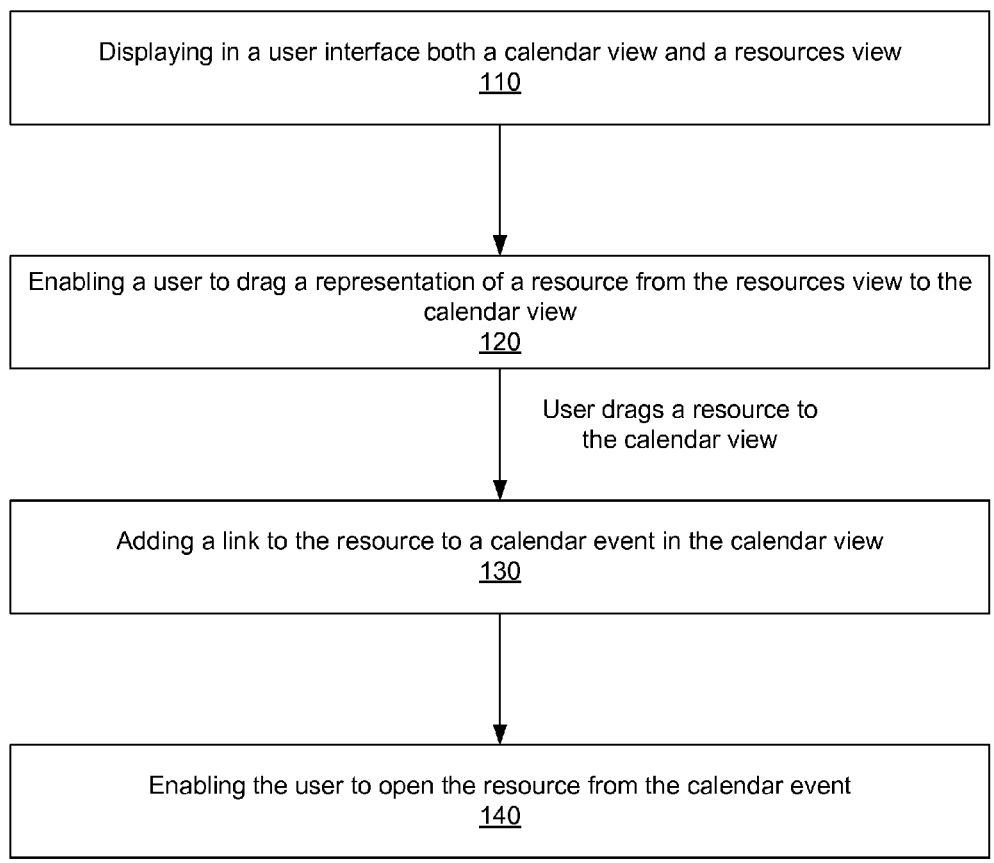
FIG. 1 is a flowchart that illustrates a general method for adding a link to a resource to a calendar event in the calendar view and enabling the user to open the resource from the calendar event.
Figure 2:
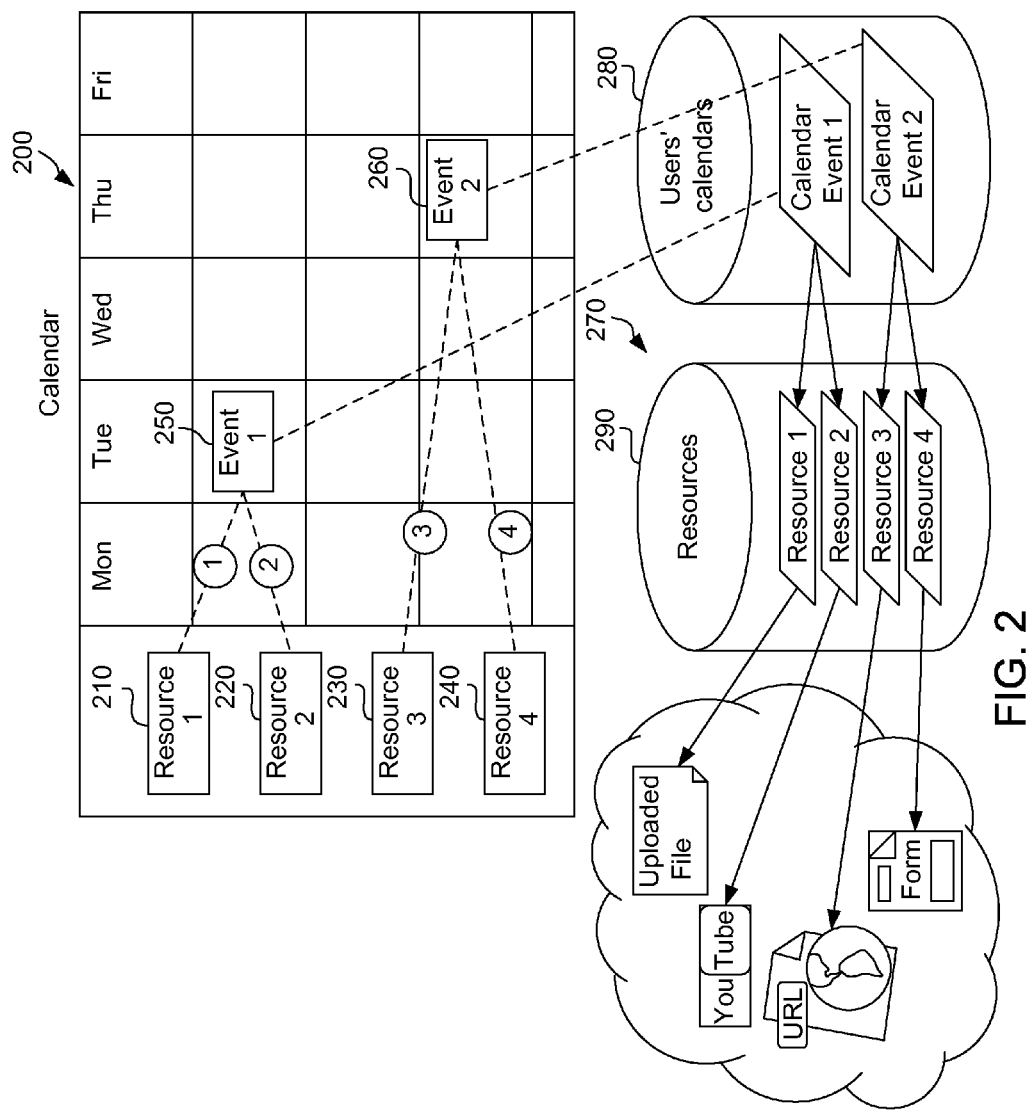
FIG. 2 is a schematic diagram illustrating the general method of FIG. 1.

FIG. 2 is a schematic representation of the method illustrated in FIG. 1. FIG. 2 illustrates the calendar view 200 of the user interface in the month view format. It could similarly be depicted in the year view format, week view format or the day view format. It may also be depicted in a quarterly format, a trimester format, or a semester format. On the left side of the calendar appear the search results of resources that are available for dragging onto the calendar in list format or tree view format. In this example, four resources are available: Resource 1 (210), Resource 2 (220), Resource 3 (230), and Resource 4 (240). Assume Resource 1 (210) is dragged to a blank day. By dragging Resource 1 (210) to a blank day, Event 1 (250) is created in that blank day and a link to Resource 1 (210) is accessible through Event 1 (250). Resource 2 (220) is then dragged to Event 1 (250). Since Event 1 (250) is already created, a new event need not be created and Resource 2 (220) is added as a link accessible through Event 1 (250). Similarly, when Resource 3 (230) is dragged to another blank day, Event 2 (260) is created in that blank day and a link to Resource 3 (230) is accessible through Event 2 (260). When Resource 4 (240) is dragged to Event 2 (260), a new event does not need to be created and Resource 4 (240) is added as a link accessible through Event 2 (260).

While the above example maps each of Resources 1-4 to a single calendar event, a person skilled in the art would understand that each resource may correspond to a plurality of events in any number of calendars. In other words, multiple calendar events may link to the same resource. Similarly, each event may have links to a plurality of resources.

FIG. 2 also illustrates a schematic system view 270, which corresponds to the calendar view 200 of the user interface. Each event in the calendar view 200 is stored in a database 280. From each calendar event, a user can link to a plurality of resources that are stored in one or more resources databases 290. In this example, Calendar Event 1 is linked to Resources 1 and 2 and Calendar Event 2 is linked to Resources 3 and 4 in database 290. The one or more resources databases 290 store resources in any number of formats. In this example, Resource 1 corresponds to an uploaded file, Resource 2 corresponds with a YouTube video, Resource 3 corresponds with a website, and Resource 4 corresponds with a form.

Figure 3:
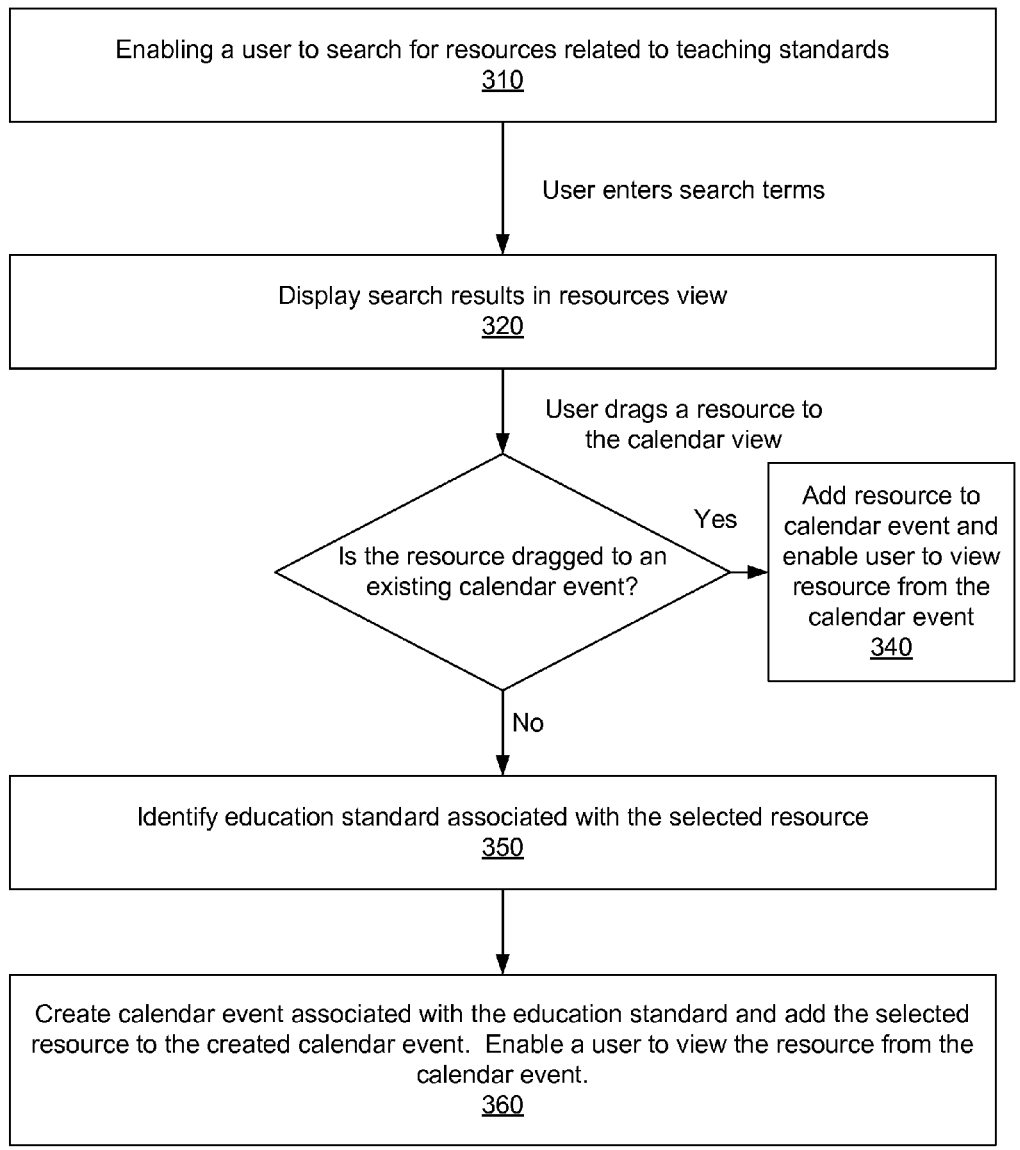
FIG. 3 is a flowchart that illustrates an example of an implementation of the method of FIG. 1 in which calendar events, associated with certain education standards, are created and resources are added to the calendar events.

The method of FIG. 1 may be applied in any number of ways. As one example implementation, the method may be applied to a management/course planning program for a teacher preparing his or her course plan (or pacing guide) for a class. As seen in FIG. 3, a user, in this case a teacher or an educator, is able to search for resources related to the teaching standards of his or her class (step 310). In the preferred embodiment, the user searches from within the resources view. Searching may be accomplished in any number of ways. For example, the user may enter search terms, select certain filters, or search through a tree view of the resources. The search results are then displayed in the resources view of the user interface (step 320). After the user views the search results, he or she may select the desired resources and drag a representation of the resource to the calendar view. As discussed above, if the resource is dragged to an existing calendar event (or, in this case, teaching event), the resource is added to the calendar event and the user is able to view the resource from the calendar event (step 340). If, however, the resource is not dragged to an existing calendar event, but to a blank day in the calendar view, the program would then identify the education standard associated with the selected resource (step 350). The program would then create a calendar event associated with the education standard and add the selected resource to the created calendar event. The user is then able to view the resource from the created calendar event (step 360). As each teaching event (e.g., lessons and assessments, such as tests and quizzes) and each resource (e.g., lesson plans) is associated with an education standard, one benefit of the above method is to ensure that the resources associated with the education standard are easily integrated together. For example, within the user interface, each teaching event would set forth the applicable education standard, one or more links to lesson plan resources associated with the education standard, and one or more links to video resources associated with the education standard.

In certain embodiments, when a user drags a representation of a resource to the calendar view, links to multiple resources associated with the dragged resource will be added to a calendar event in the calendar view. For example, a worksheet on multiplication may be linked together with a video. When the user drags the representation of the multiplication worksheet to the day in which the teacher plans to give a lesson on multiplication, a link to the corresponding video may also be added to the calendar or teaching event.

In certain embodiments, the resources displayed in the resource view include a "collection" resource, where the collection resource is a collection of multiple resources from one or more resource systems. For example, in a course planning system for teachers, a collection may include lesson plans, quizzes, videos, etc. related to a particular education standard or topic. The resources in the collection resource may be intended for events that occur over multiple days, and the collection may be associated with a schedule. Consequently, when a collection resource is dragged to the calendar view, the resources within the collection may be distributed over multiple calendar events. Collection resources may be scheduled relative to one another in the calendar. For example, the first day of the collection resource series may include a pre-quiz, a lesson plan, and a video for a particular education topic. The second day of the collection resource series may include a lesson plan, a worksheet, and another video for the topic. The third day of the collection resource series may include a final quiz on the topic. When a representation of the collection resource is dragged to the calendar, the first day of the collection resource series is added to the day selected by the user and the rest of the series is scheduled relative to the first day, taking into account weekends and holidays.

In certain embodiments, the user may have more than one calendar, for example, one calendar for each class that he or she is teaching that term. When the user drags a representation of a resource to the calendar view, the user may be provided with the option of selecting one or more of the available calendars. A link to the resource is added to a calendar event in each of the selected calendar views and the user is able to open the resource from the calendar event. In certain embodiments, an existing calendar may not be available to accept links to resources if, for example, certain restrictions have been placed on it by the teacher or an administrator. Restrictions may be general, such as a lock on a calendar to prevent any future changes, or specific, such as a predetermined set of rules whereby certain resources may not be added to certain calendars (e.g., a math resource cannot be added to an English class or a quiz resource can only be dragged to a class calendar, but not a school or district calendar). In certain embodiments, a user may drag a representation of a resource to a third party's calendar view. For example, an administrator may drag a video onto the calendar view of a teacher, a teacher may drag a worksheet onto the calendar view of his or her students, or a grade level department chair may drag a standard onto the calendar view of all of the teachers in a particular grade level.

In certain embodiments, dragging a representation of a resource from the resources view to the calendar view triggers an automatic action, which may take place immediately or at a future time. For example, if an agenda resource is dragged into a meeting event on a calendar, the attendees of the meeting are notified that the agenda is available or updated.

In certain embodiments, dragging a representation of a resource from the resources view to the calendar view prompts the user for an action. For example, if an agenda resource is dragged to a calendar event without designated attendees, the meeting organizer may be prompted to input a list of attendees. In some cases, the user is prompted to add another event to the calendar. For example, if a lesson plan resource is dragged into the calendar, the user may be prompted with the option of creating a quiz associated with the lesson plan in the same or future calendar event.

In certain embodiments, the above-described system is correlated with a payment model. For example, in a pay-for-use model, a user of the above system may freely search for and locate resources. Once the user drags a resource to a calendar, an automatic charge is applied to the user (or the school district). In another pre-paid model, a user (or the school district) can purchase in advance blocks of content. In other embodiments, the content provider would absorb the charge rather than the user, perhaps through a sponsorship program or for advertising privileges.

Figure 6:
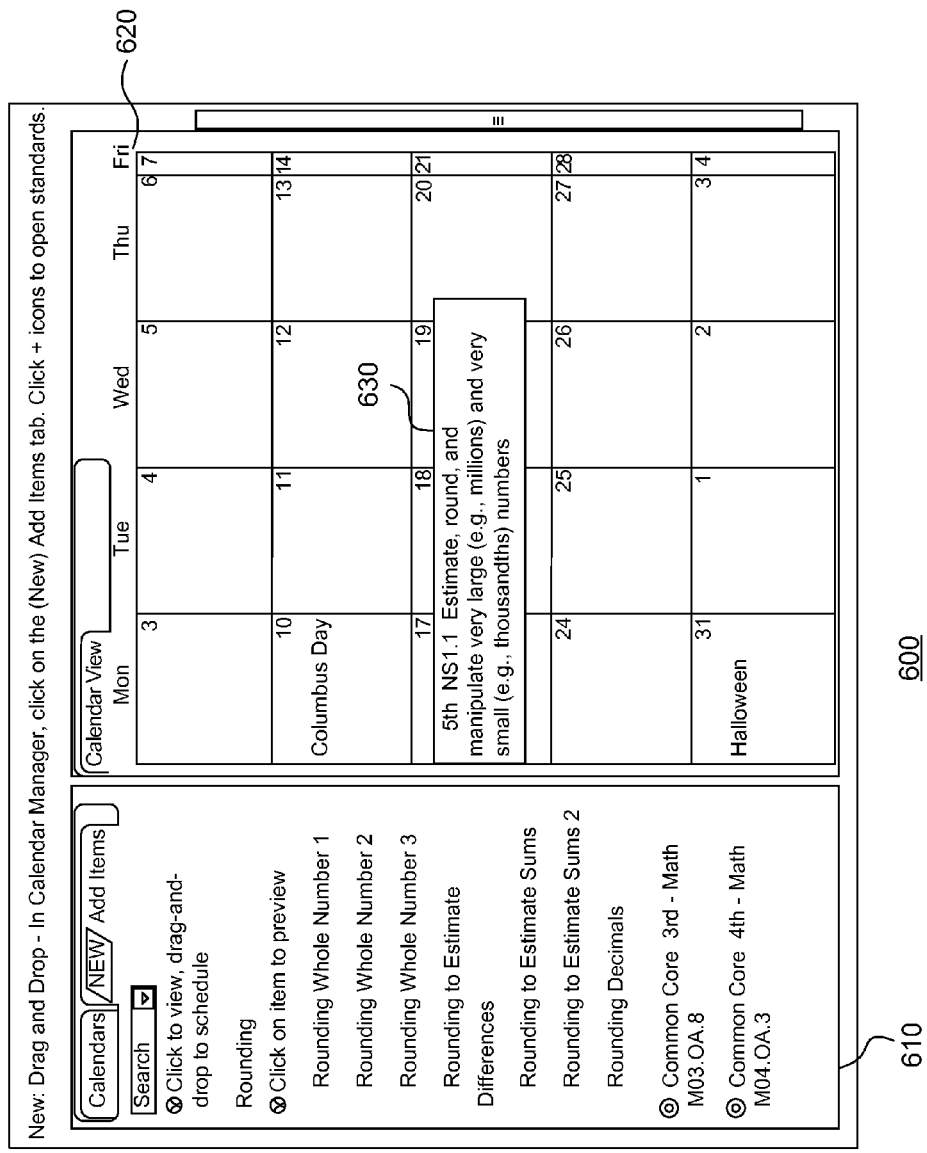
FIG. 6 is an illustration of an example user interface with a calendar view and a resources view.

FIG. 6 illustrates an example user interface according to the present invention with a resource view 610, a calendar view 620, and calendar event 630. In this example, the system is a course planning system that enables teaches to create course plans. When a user of the system selects a particular calendar event (e.g., calendar event 630), they may view the exemplary user interface shown in FIGS. 4 and 5. The calendar event illustrated in FIGS. 4 and 5 includes a Lesson Notes tab 430, 530, a Standards tab 440, 540, and a Resources tab 450, 550. FIG. 4 illustrates a calendar event 400 with the education standard tab 440 selected and FIG. 5 illustrates the same calendar event 500 with the resources tab selected 550. At the top of each calendar event 400, 500, the user can see the title or subject matter of the event 410, 510. Beneath the title 410, 510 is the date(s) 420, 520 of the calendar event on the calendar view. The date(s) may be a single day or a period of time, such as a week or ten days. The calendar event also may include a section for Lesson Notes 430, 530. When the standards tab 440 is selected, the calendar event displays the education standard that corresponds to the calendar or teaching event. When the resources tab 550 is selected, the calendar event displays resources that correspond to the education standards of the teaching event. In this example, links to three videos 560 are listed that correspond to the education standard presented in FIG. 4.

Although FIGS. 3-6 have been described with respect to a course planning system, the invention is not limited to such a system. The invention may be implemented in other systems that provide calendaring functionality.

The methods described with respect to FIGS. 1-3 are embodied in software and performed by a computer system executing the software. A person skilled in the art would understand that a computer system has a memory or other physical storage medium for storing software instructions and one or more processors for executing the software instructions. The computer system may have access to one or more databases, which store the calendar and resources files.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method, in a computer system that provides calendaring functionality enabling a user to view resource content from within a calendar view, the method comprising:
    displaying in a user interface both a calendar view and a resources view,
        wherein at least one representation of a resource displayed in the resources view is a collection resource and
        wherein a collection resource is a collection of multiple resources having one or more resource types;
    enabling a user to drag a representation of a resource from the resources view to the calendar view;
    in response to a user dragging a representation of a collection resource from the resources view to a selected day in the calendar view,
        creating new calendar events beginning with the selected day in the calendar view,
        distributing the multiple resources of the collection resource over multiple calendar events that occur over multiple calendar days in the calendar view according to a schedule for the collection resource,
        wherein distributing the multiple resources comprises adding links to each of the resources within the multiple resources to the multiple calendar events and
        wherein one or more resources for the first day of the collection resource is added to the day selected by the user and the rest of the resources in the collection resource is scheduled relative to the first day taking into account weekends and holidays; and
    enabling the user to open each of the multiple resources associated with the dragged representation of the collection resource using the links from its respective calendar event.

2. The method of claim 1, wherein one type of resource is a file.

3. The method of claim 1, wherein one type of resource is a video.

4. The method of claim 1, wherein one type of resource is a form.

5. The method of claim 1, wherein one type of resource is a report.

6. The method of claim 1, wherein one type of resource is a representation of a person.

7. The method of claim 1, wherein one type of resource is a website.

8. The method of claim 1, wherein the resource can also be downloaded.

9. The method of claim 1, wherein the resources displayed in the resources view are the result of a search for resources based on search terms entered and/or filters selected by the user in the user interface.

10. The method of claim 1, wherein the resources displayed in the resources view are in a tree view of the resources in the user interface.

11. The method of claim 1, wherein a resource is dragged to an existing calendar event or to a blank day in the calendar view.

12. The method of claim 11, wherein, in response to a resource being dragged to a blank day in the calendar view, a new calendar event is created and a link to the resource is added to the new calendar event.

13. The method of claim 12, wherein each resource is associated with a task in the system, and the new calendar event corresponds to the task associated with the dragged resource.

14. The method of claim 1, wherein a first resource is linked to a second resource and in response to a user dragging a representation of the first resource to the calendar view, adding links to both the first and the second resources to a calendar event in the calendar view.

15. The method of claim 1, wherein in response to a user dragging a representation of a resource to the calendar view, providing the user with the option of selecting one or more of the available calendars, adding a link to the resource to a calendar event in each of the selected calendar views, and enabling the user to open the resource from the calendar event.

16. The method of claim 1, wherein for each resource, a predetermined set of rules is established by which certain resources may not be added to certain calendars.

17. The method of claim 1, further comprising enabling a user to drag a representation of a resource from the resources view to the calendar view of a third party.

18. The method of claim 1, wherein dragging a representation of a resource from the resources view to the calendar view triggers an automatic action.

19. The method of claim 18, wherein the automatic action takes place immediately.

20. The method of claim 18, wherein the automatic action takes place at a future time.

21. The method of claim 18, wherein the automatic action comprises automatically charging the user for the resource.

22. The method of claim 1, wherein dragging a representation of a resource from the resources view to the calendar view prompts the user for an action.

23. The method of claim 22, wherein prompting the user for an action further comprises adding another event to the calendar.

24. The method of claim 1, wherein the computer system enables teachers to create a course plan for a class and a calendar event is a teaching event.

25. The method of claim 24, wherein types of teaching events include lessons and assessments.

26. The method of claim 25, wherein one type of resource is a lesson plan.

27. The method of claim 1, wherein each teaching event and each resource is associated with an education standard.

28. The method of claim 27, wherein in response to a user dragging a resource to a blank day in the calendar view, a new teaching event is created that corresponds to the standard associated with the dragged resource and a link to the dragged resource is added to the new teaching event.

29. The method of claim 28, wherein each teaching event sets forth the applicable education standard, one or more links to lesson plan resources associated with the education standard, and one or more links to video resources associated with the education standard.

30. A computer program embodied on a non-transitory computer-readable medium and comprising code, that, when executed by a computer system, enables the computer system to perform the following method enabling a user to view resource content from within a calendar view:
displaying in a user interface both a calendar view and a resources view,
wherein at least one representation of a resource displayed in the resources view is a collection resource and
wherein a collection resource is a collection of multiple resources having one or more resource types;
enabling a user to drag a representation of a resource from the resources view to the calendar view;
in response to a user dragging a representation of a collection resource from the resources view to a selected day in the calendar view,
creating new calendar events beginning with the selected day in the calendar view,
distributing the multiple resources of the collection resource over multiple calendar events that occur over multiple calendar days in the calendar view according to a schedule for the collection resource,
wherein distributing the multiple resources comprises adding links to each of the resources within the multiple resources to the multiple calendar events and
wherein one or more resources for the first day of the collection resource is added to the day selected by the user and the rest of the resources in the collection resource is scheduled relative to the first day taking into account weekends and holidays; and
enabling the user to open each of the multiple resources associated with the dragged representation of the collection resource using the links from its respective calendar event.

31. A computer system enabling a user to view resource content from within a calendar view, the system comprising:
a processor;
a memory coupled to the processor, wherein the memory stores instructions that, when executed by the processor, cause the system to perform the operations of:
displaying in a user interface both a calendar view and a resources view,
wherein at least one representation of a resource displayed in the resources view is a collection resource and
wherein a collection resource is a collection of multiple resources having one or more resource types;
enabling a user to drag a representation of a resource from the resources view to the calendar view;
in response to a user dragging a representation of a collection resource from the resources view to a selected day in the calendar view,
creating new calendar events beginning with the selected day in the calendar view, distributing the multiple resources within the collection resource over multiple calendar events that occur over multiple calendar days in the calendar view according to a schedule for the collection resource, wherein distributing the multiple resources comprises adding links to each of the resources within the multiple resources to the multiple calendar events and wherein one or more resources for first day of the collection resource is added to the day selected by the user and the rest of the resources in the collection resource is scheduled relative to the first day taking into account weekends and holidays;

and enabling the user to open each of the multiple resources associated with the dragged representation of the collection resource using the links from its respective calendar event.

32. The computer system of claim 31, wherein the resources are stored in one or more databases.

* * * * *